USO05197021A

United States Patent [19]

Cucchi et al.

[11] Patent Number: 5,197,021
[45] Date of Patent: Mar. 23, 1993

[54] SYSTEM AND CIRCUIT FOR THE CALCULATION OF THE BIDIMENSIONAL DISCRETE TRANSFORM

[75] Inventors: Silvio Cucchi; Marco Fratti, both of Milan, Italy

[73] Assignee: Telettra-Telefonia Elettronica e Radio s.p.a., Milan, Italy

[21] Appl. No.: 551,628

[22] Filed: Jul. 11, 1990

[30] Foreign Application Priority Data

Jul. 13, 1989 [IT] Italy .............................. 21420/89[U]

[51] Int. Cl.⁵ .............................................. G06F 7/38
[52] U.S. Cl. .................................................. 364/725
[58] Field of Search ................................ 364/725-726

[56] References Cited

U.S. PATENT DOCUMENTS

| | | | |
|---|---|---|---|
| 4,196,448 | 4/1980 | Whitehouse et al. | 364/725 |
| 4,293,920 | 10/1981 | Merola | 364/725 |
| 4,385,363 | 5/1983 | Widergren et al. | 364/725 |
| 4,449,194 | 5/1984 | Wilhelm | 364/725 |
| 4,679,163 | 7/1987 | Arnould et al. | 364/725 |
| 4,791,598 | 12/1988 | Liou et al. | 364/725 |
| 4,849,922 | 7/1989 | Riolfo | 364/725 |

OTHER PUBLICATIONS

Nussbaumer, "Fast Multidimensional Discrete Cosine Transforms", IBM Tech. Discl. Bull. vol. 23, No. 5, Oct. 1980, pp. 1976-1981.
Haque, "A Two-Dimensional Fast Cosine Transform", IEEE Trans. on Acoustics, Speech, and Signal Processing, vol. ASSP—33, No. 6, Dec. 1985, pp. 1532-1539.
Haralick, "A Storage Efficient Way to Implement the Discrete Cosine Transform", IEEE Trans. on Computers, Jul. 1976, pp. 764-765.
Kamanger et al., "Fast Algorithms for the 2—D Discrete Cosine Transform", IEEE Trans. on Computers, vol. C—31, No. 9, Sep. 1982, pp. 899-906.
W. H. Chen et al., "A Fast Computational Algorithm for the Discrete Cosine Transform", IEEE Transactions on Communications, vol. COM-25, No. 9 (Sep. 1977), pp. 1004-1009.
S. Cucchi et al., "DCT Based Television Codec for DS3 Digital Transmission", 130th Society of Motion Picture and Television Engineers Technical Conference, (Oct. 15-19, 1988).
F. Jutand et al., "A Single Chip Video Rate 16×16 Discrete Cosine Transform", Proc. Int. Conf. Acoustic, Speech and Signal Processing, Tokyo, Japan, (1986), pp. 805-808.

Primary Examiner—Tan V. Mai
Attorney, Agent, or Firm—Ostrolenk, Faber, Gerb & Soffen

[57] ABSTRACT

A system for calculating the discrete cosine transform of dimension M*M which is orthogonal and separable under the form of two monodimensional transforms calculated by a fast algorithm, by operating on incoming and outgoing words, in the form of parallel bits, and by operating on the data internally in the system in words represented by 2M bits. The operations of addition and subtraction between variable data and the operations of multiplying by the variable data using fixed coefficients are made on the data represented in the form of M couples of serialized bits, so that the speed of the incoming and outgoing words, in the form of words of parallel bits, is equal to the speed of bit couples that represent the internal data. A circuit implemented onto a silicon base for implementation the fulfillment of this system includes at least: an input interface; a converter for incoming words for the conversion from the form of parallel bits to the form of words represented by serial bit couples for the incoming words and vice versa for the outgoing words; a first operator for the discrete cosine transform (DCT) monodimensional transform; a transpositor from lines to columns; a second operator for monodimensional transform; and a scaling device for outgoing words.

2 Claims, 13 Drawing Sheets

| Time | $T_0$ | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ |
|---|---|---|---|---|---|---|---|---|---|---|---|---|---|
| X | | $X_0$ $X_1$ | $X_2$ $X_3$ | $X_4$ $X_5$ | $X_6$ $X_7$ | $X_8$ $X_9$ | $X_{10}$ $X_{11}$ | $X_{12}$ $X_{13}$ | $X_{14}$ $X_{15}$ | $X_0$ $X_1$ | $X_2$ $X_3$ | $X_4$ $X_5$ | |
| + | | | | | | | | | | | | | |
| Y | | $Y_0$ $Y_1$ | $Y_2$ $Y_3$ | $Y_4$ $Y_5$ | $Y_6$ $Y_7$ | $Y_8$ $Y_9$ | $Y_{10}$ $Y_{11}$ | $Y_{12}$ $Y_{13}$ | $Y_{14}$ $Y_{15}$ | $Y_0$ $Y_1$ | $Y_2$ $Y_3$ | $Y_4$ $Y_5$ | |
| (X+Y) | | $S_0$ $S_1$ | $S_2$ $S_3$ | $S_4$ $S_5$ | $S_6$ $S_7$ | $S_8$ $S_9$ | $S_{10}$ $S_{11}$ | $S_{12}$ $S_{13}$ | $S_{14}$ $S_{15}$ | $S_0$ $S_1$ | $S_2$ $S_3$ | $S_4$ $S_5$ | |
| $(X+Y)2^{-4}$ | | E E | E E | $S_4$ $S_5$ | $S_6$ $S_7$ | $S_8$ $S_9$ | $S_{10}$ $S_{11}$ | $S_{12}$ $S_{13}$ | $S_{14}$ $S_{15}$ | E E | E E | $S_4$ $S_5$ | |

$$E = S_{15}$$

Preset = 1 for T = T0
Load = 1 for T = T8
Selection = 1 for T = T9, T10

*FIG. 3b*

| Time | $T_0$ $T_1$ $T_2$ $T_3$ $T_4$ $T_5$ $T_6$ $T_7$ $T_8$ $T_9$ $T_{10}$ $T_{11}$ $T_{12}$ |
|---|---|
| X | $X_0$ $X_2$ $X_4$ $X_6$ $X_8$ $X_{10}$ $X_{12}$ $X_{14}$ $X_0$ $X_2$ $X_4$<br>$X_1$ $X_3$ $X_5$ $X_7$ $X_9$ $X_{11}$ $X_{13}$ $X_{15}$ $X_1$ $X_3$ $X_5$ |
| +<br>Y | $Y_0$ $Y_2$ $Y_4$ $Y_6$ $Y_8$ $Y_{10}$ $Y_{12}$ $Y_{14}$ $Y_0$ $Y_2$ $Y_4$<br>$Y_1$ $Y_3$ $Y_5$ $Y_7$ $Y_9$ $Y_{11}$ $Y_{13}$ $Y_{15}$ $Y_1$ $Y_3$ $Y_5$ |
| (X+Y) | $S_0$ $S_2$ $S_4$ $S_6$ $S_8$ $S_{10}$ $S_{12}$ $S_{14}$ $S_0$ $S_2$ $S_4$<br>$S_1$ $S_3$ $S_5$ $S_7$ $S_9$ $S_{11}$ $S_{13}$ $S_{15}$ $S_1$ $S_3$ $S_5$ |
| $(X+Y)2^{-3}$ | E E $S_4$ $S_6$ $S_8$ $S_{10}$ $S_{12}$ $S_{14}$ E E $S_4$<br>E $S_3$ $S_5$ $S_7$ $S_9$ $S_{11}$ $S_{13}$ $S_{15}$ E $S_3$ $S_5$ |

DELAY OF THE ODD FLOW
AND FLOW INVERSION

| $(X+Y)2^{-3}$ | E $S_3$ $S_5$ $S_7$ $S_9$ $S_{11}$ $S_{13}$ $S_{15}$ E $S_3$ $S_5$<br>E E $S_4$ $S_6$ $S_8$ $S_{10}$ $S_{12}$ $S_{14}$ E E $S_4$ |
|---|---|

$E = S_{15}$

Preset = 1 for T = T0
Load = 1 for T = T8
Selection0 = 1 for T = T9, T10
Selection1 = 1 for T = T9

FIG. 4b $C_1 = 0.111101\bar{1}000101$ $S_1 = 0.001000111100$ $C'_1 = 1.00000\bar{1}0\bar{1}000\bar{1}01$ $S'_1 = 0.010\bar{1}0010000\bar{1}00$ $Z = -XC_1 + YS_1$ $W = XS_1 + YC_1$ $Z = -XC'_1 + YS'_1 = -X + Y\,2^{-2} - Y\,2^{-4} + X\,2^{-6} + Y\,2^{-7} + X\,2^{-8}$ $\qquad -X\,2^{-12} - Y\,2^{-12} - X\,2^{-14}$ $W = XS'_1 + YC'_1 = +Y + X\,2^{-2} - X\,2^{-4} + Y\,2^{-6} + X\,2^{-7} + Y\,2^{-8}$ $\qquad +Y\,2^{-12} - X\,2^{-12} + Y\,2^{-14}$

SYSTEM AND CIRCUIT FOR THE CALCULATION OF THE BIDIMENSIONAL DISCRETE TRANSFORM

BACKGROUND OF THE INVENTION

1. Field of the Invention

The present invention relates to a method for calculating the bidimensional discrete cosine transform and the circuitry for implementing such a method.

2. Description of the Related Art

As is well-known, the encoding of television signals is made efficient by the use of the discrete cosine transform (DCT) having dimension 8*8, or, more generally M*M, where M is a power of 2.

In commercial television, the number of samples to be processed is very high (typically over 10 millions of samples per second, and for digital studio format on the order of 27 millions of samples per second), and, in particular, for high-definition television (HDTV), the sample flow on which it is necessary to operate the DCT is higher than 100 millions per second; in HDTV, many processors operating in parallel are used, but obviously a circuit that performs the bidimensional DCT faster is desirable because it reduces the number of processors which must be used.

There some well-known integrated circuits for performing the bidimensional DCT. However, to increase the calculation speed and at the same time keep the number of logic gates within reasonable limits, these circuits must perform the calculations in serial arithmetic.

See, in particular, the articles by F. Jutland, N. Demassieux, G. Concordel, J. Guichard, E. Cassimatis, "A single chip video rate 16*16 Discrete Cosine Transform" (Proc. Int. Conf. Acoustic, Speech and Signal Processing 1986) and S. Cucchi, F. Molo, "DCT based television coded for DS3 digital transmission" (130th SMPTE Technical Conference 1988), which describe circuits for executing the bidimensional DCT using serial arithmetic. In particular, the article by Cucchi and Molo describes the bidimensional DCT 8*8, made of two monodimensional DCTs of dimension 8, followed by the calculation scheme proposed by Chen, Fralick and Smith in the article "A fast computational algorithm for the Discrete Cosine Transform" (IEEE Trans. on Comm., September 1977).

The bidimensional DCT of dimension M*M is executed by decomposing it into two transforms of dimension M, and serial arithmetic is used for the calculation thereof. For precision and accuracy, numbers are represented with B binary ciphers, where B is usually equal to 16; it must be noted that the words coming into the DCT and the words out from the same DCT (the calculation results) are under 16 bits (usually from 8 to 12 bits). As the words on the DCT is applied enter the calculation circuit under the form of parallel bits at a speed $R_p$, the words are transformed from parallel into serial form before the two DCTs are performed (and an inverse transform is performed before sending to the words are outputted from the transform). The bit speed $R_s$ in the inside of the processor DCT is given by:

$$R_s = \frac{R_p \times 16}{M}$$

where M is the dimension of the DCT, and 16 is the number of serial bits of each word used for making the calculations. In the case of a DCT having dimension 8 (M=8), (normally the best compromise between the complexity and efficiency), it is:

$$R_s = 2R_p$$

i.e. he transfer speed of bits in words of serial form is twice the speed of the words coming into and out of the DCT processor, which on the one hand requires that the DCT processor being supplied with a clock frequency twice the frequency of the incoming and outgoing words, and on the other hand requires higher frequency calculating elements or equivalently requires keeping speed at which the bits are processed in the inside of the processor constant to limit the speed of incoming and outgoing words.

SUMMARY OF THE INVENTION

The present invention overcomes the above mentioned drawbacks. As seen from the above equation, for an 8*8 DCT with 16 bit words:

$$R_s = \frac{R_p \times 16}{M}$$

In the invention, each word is represented in the form of two serial flows (Sp and Sd) of 8 bits, instead of a single serial flow S of 16 bits. The two serial flows are made of—respectively—the bits of even positions (even flow Sp) and the bits of odd positions (odd flow Sd) of the processing data. In particular, the elementary calculation elements (adders/substractors) are arranged to operate on bit couples instead of single bits. In this manner, at each clock stroke, a bit of even flow Sp and a bit of odd flow Sd are processed. Thus, it is possible to get a transfer speed of the word bits in the serial form equal to:

$$R_s = \frac{R_p \times 8}{8} = R_p$$

The unavoidable reduction of calculation speed, due to the necessity of processing bit couples instead of onto single bits, is insignificant with respect to the factor of 2 increase in bit speed $R_s$ inside the processor. The invention is applicable to situations in which it is necessary to perform a dimensional transform M*M, with M a power of 2, and in which the calculations are made in serial onto bit couples of words having a length equal to 2 Mbit.

BRIEF DESCRIPTION OF THE DRAWINGS

These and other features and advantages of the present invention will become apparent when the following description is read in conjunction with the accompanying drawings in which:

FIG. 3b shows a diagram of the summation $(X+Y)2^{-4}$ versus time;

FIG. 4b shows a diagram of the summation $X+Y)2^{-4}$ versus time;

DETAILED DESCRIPTION OF THE PREFERRED EMBODIMENT

I. Introduction

To begin, a short description of a general bidimensional DCT is helpful. If X is a matrix 8*8 of input samples, we have:

$$DCT(X) = Y = AXA^T$$

where A is the transform matrix. Due to the associative property of the matrix product, we can write:

$$Y = A(XA^T)$$

We can make the first product $Z = XA^T$ (monodimensional DCT), by operating onto the lines of the matrix X. We can then make the product $Y = A Z$ (monodimensional DCT) by operating on the columns of the intermediate matrix Z.

The matrix products $XA^T$ and $A Z$ are computed by fast algorithms, for example the ones indicated in the above-mentioned article by Chen, Fralick and Smith.

Similarly, after having calculated the matrix Z, we can calculate $Z^T$ (transposed matrix of Z) and then $Y^T = Z^T A^T$, operating again the lines of the matrix $Z^T$ (note that the outputted matrix is transposed).

Thus, generally speaking, a bidimensional DCT can be seen as a cascade of:

monodimensional DCT transform;
transposition of the intermediate matrix; and
monodimensional DCT transform.

It is thus necessary to have:

two calculation blocks that make the monodimensional DCT transform; and
a block that carries out the transposition of a matrix.

Further, since the calculations inside the chip are made by serial arithmetic, while the samples at the input and at the output of the processor are in parallel format, it is necessary to have a parallel-serial-parallel converter.

A. THE "TOP-LEVEL" OF THE DCT PROCESSOR

Figure 1:
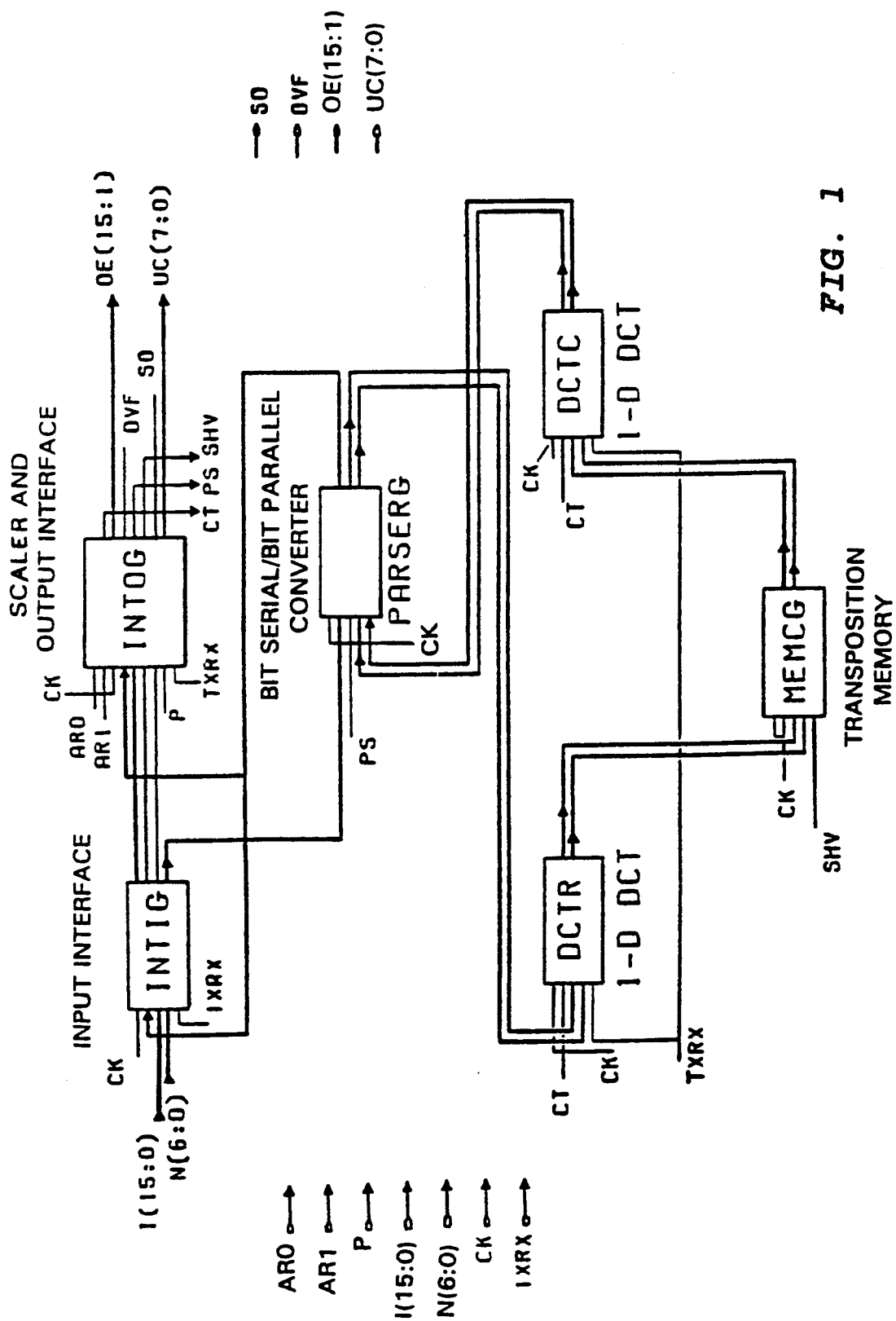
FIG. 1 is a block diagram of the bidimensional DCT processor of the present invention.

FIG. 1 is a block diagram of the bidimensional DCT processor; it carries out the bidimensional DCT 8*8, both in transmission and in reception (according to the control TXRX). In accordance with what has been described above, two calculation blocks are present for carrying out the monodimensional DCT and one block for the transposition the intermediate matrix.

In particular:

If TXRZ=1, DCTR carries out the DCT by rows and DCTC carries out the DCT by columns; and
If TXRZ=0, DCTR carries out the IDCT by columns and DCTC carries out the IDCT by rows.

FIG. 1 shows, in particular:

a) The calculation blocks DCTR and DCTC;
b) The block that makes the conversion from parallel bits to serial bit couples for the incoming words and vice versa for the outgoing words (PARSERG); and
(c) the block that makes the transposition of the calculation matrix (DCT rows—DCT columns) MEMCG; and
(d) the block that makes the shifts onto the samples of the transformed signal (INTIG, INTOG).

FIG. 1 also shows the input-output signals and the control signals internal to the chip:

(a) Input signals:
I(15:0): input samples, in complement two's into parallel format;
P: reset of internal counters;
AR1, AR0: selections for the rounding off of data at processing output;
N (6:0): Shift factor operating onto the DCT coefficients: $0 \leq N (6:0) \leq 127$;
CK: machine clock input; and
TXRX: transmission/reception selection.

b) Output signals:
OE (15:1): output samples in complement two's in parallel format;
OVF: overflow survey;
SO: output synchronization; and
UC (7:0): external output of the counter.

c) Control signals internal to the chip:
CT: control of DCTR and DCTC calculation blocks;
PS: control of the PARSERG; and
SHV: control of the MEMCG.

The blocks forming the processor are now described.

THE CALCULATION BLOCKS

Referring to FIG. 1, the DCTR and DCTC blocks carry out the calculation of the two monodimensional DCTs. The transform operations are implemented using "Fast" algorithms and they form some calculation "throttles" in cascade (in reception, the order of the throttles is inverted with the respect to transmission). The main operations made by the calculation throttles are: summation, subtraction, multiplication. Using serial arithmetic and interpreting the multiplication as a succession of partial summations, it can be seen how it is useful to have an elementary cell that carries out the summation and subtraction operations, and then can be also used to calculate multiplications.

Some operations of the elementary calculation structure are now described and its use as basic component of a calculation throttle is illustrated.

THE ELEMENTARY ADDER/SUBTRACTOR

Figure 2:
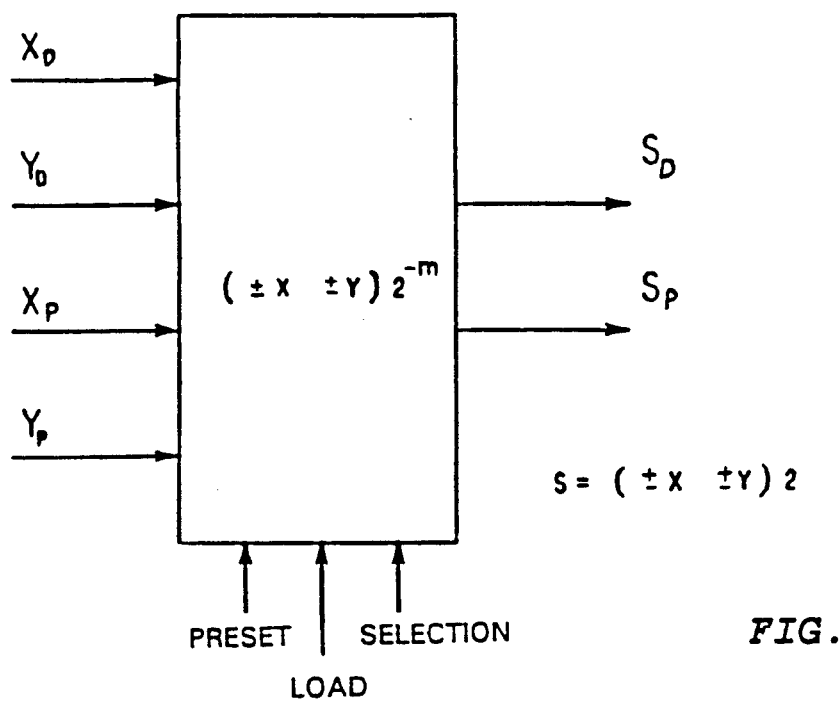
FIG. 2 shows the main block of the transform operation.

FIG. 2 shows how an elementary adder/subtractor works on serialized bit couples. It represents the main block of the transform operation. The equation $S = (\pm X \pm Y)2^{-m}$ means that given the variable quantities X and Y (positive or negative), a summation or subtraction is performed, and the result must be divided by $2^m$. The input variable X of 16 bits:

$$X = (x_0, x_1, \ldots x_{15})$$

is processed in the form of two serial flows:

$$X_p = (x_0, x_2, \ldots x_{14})$$

$$X_d = (x_0, x_3, \ldots x_{15})$$

where $X_p$ and $X_d$ are, respectively, the even serial flow and the odd serial flow 8 bits each (similarly for the input variable Y).

The output variable S with 16 bits:

$$S = S_0, S_1, \ldots S_{15}$$

is made-up of the serial flows (each of 8 bits);

$$S_p = (S_0, S_2, \ldots S_{14})$$

$$S_d = (S_0, S_3, \ldots S_{15})$$

The "Preset", "Load", "Selection" signals, arising from a proper control circuit, must correctly synchronize the summation-start and summation-end.

The value $2^{-m}$ is the binary weight of the current summation.

Figure 3A:
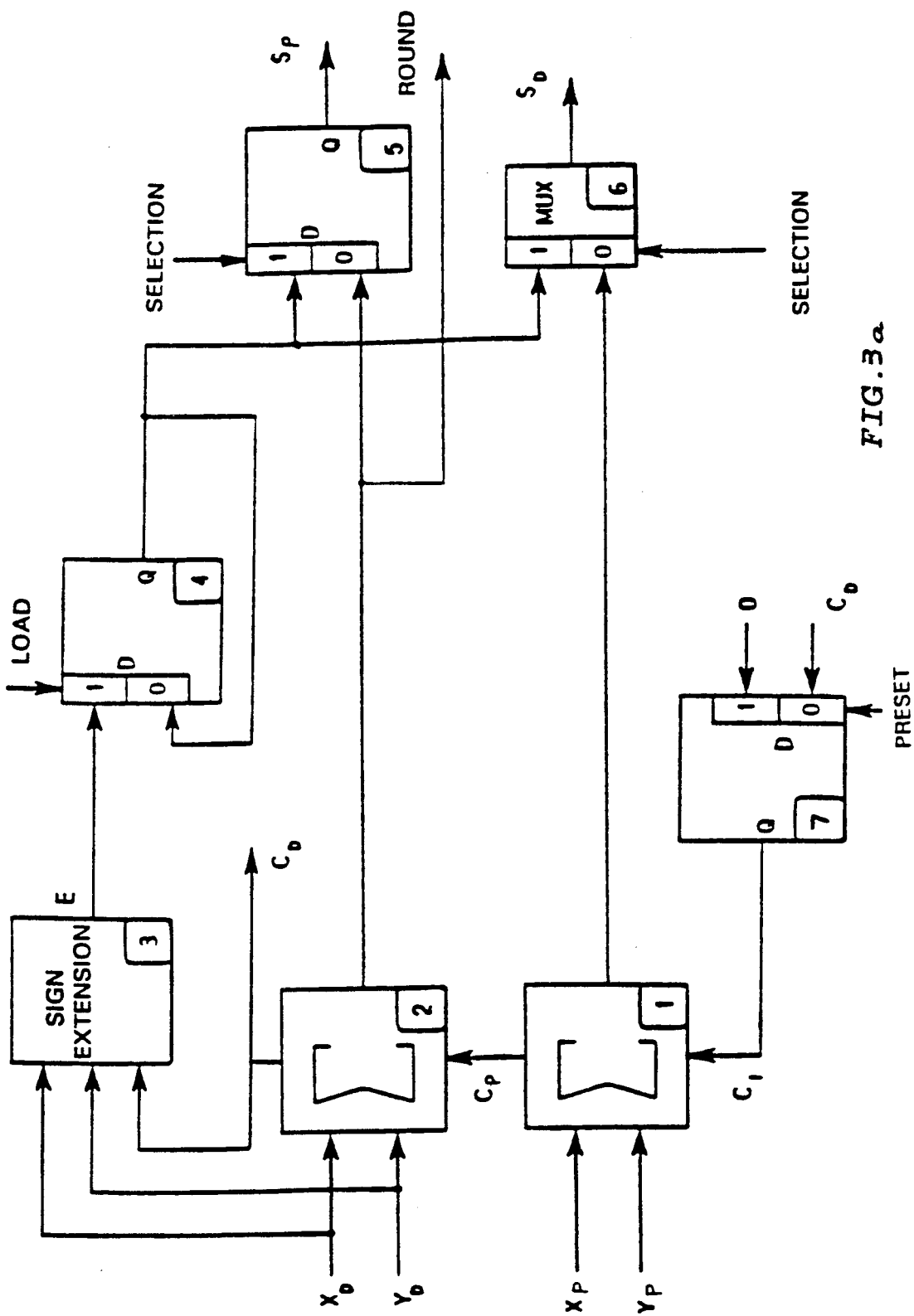
FIG. 3a is an exploded view of FIG. 2.

What is said above can be shown by an example, referring to FIG. 3a, an exploded view of the FIG. 2.

In particular, suppose we calculate:

$$S = (X + Y) 2^{-4}$$

Referring to a variable quantity of weight $2^0$, it is seen how, to carry out the correct sumation, a sign extension onto four bits is necessary. Referring to FIG. 3a ("EVEN" adder):

The blocks "1" and "2" (Full-adders) carry out the summations on bit couples at input.

The block "3" (XNOR with 3 inputs) carries out the sign extension of the summation.

The block "7" (Flip-Flop with selection) loads the initial carry (preset=1) or the current carry (Preset=0) of the summation. The block "4" (Flip-Flop with selection) loads the sign extension of the current summation (Load=1) or keeps the sign extension of the former summation (Load=0).

The blocks "5" and "6" (Multiplexer) supply at output the values of the summation (Selection=0) or the sign extension (Selection=1). It must be noted that a "Round" output is also present (in the addition to two serial output flows). In fact, the final summation of a multiplication throttle must be made considering a rounding, as the final result must be represented, in any case, in two serial flows of 8 bits.

The following illustrates an example of the "Round" use. FIG. 3b shows a diagram of the summation $(X + Y) 2^{-4}$ versus time. It must be noted that the 2i-th-bits and the (2i+1)th-bits are processed contemporaneously. "E" shows the sign extension of the summation $(X + Y) 2^{-4}$. When Preset=1 (at time To), an initial carry (0) is loaded into the block "7". At time T1, the summation of the first two bits of the relevant even flows is as follows:

$$S_0 = X_1 + Y_0 + C_i(C_i = 0)$$

The output carry of the summation (Cp) forms the input carry of the summation of the first two bits of the relevant odd flows:

$$S_1 = X_1 + Y_1 + C_p$$

The output carry of the summation (Cd) is loaded into the block "7" (preset=0) and at time T2, the input carry Ci of the following summation onto the even flows, and so on. At time T8, the last bit of the summation is calculated $$S_{15} = X_{15} + Y_{15} + C_p$$

and contemporaneously the sign extension is calculated $$E = X_{15} = Y_{15} + C_d$$

When Load=1 (at time T8), the sign extension is loaded into the block "4".

Assuming that Selection=1 at the time T9, T10, the sign extension is kept correctly for two time instants (4 bits). Suppose now we calculate:

$$(X + Y)2^{-3}$$

Figure 4A:
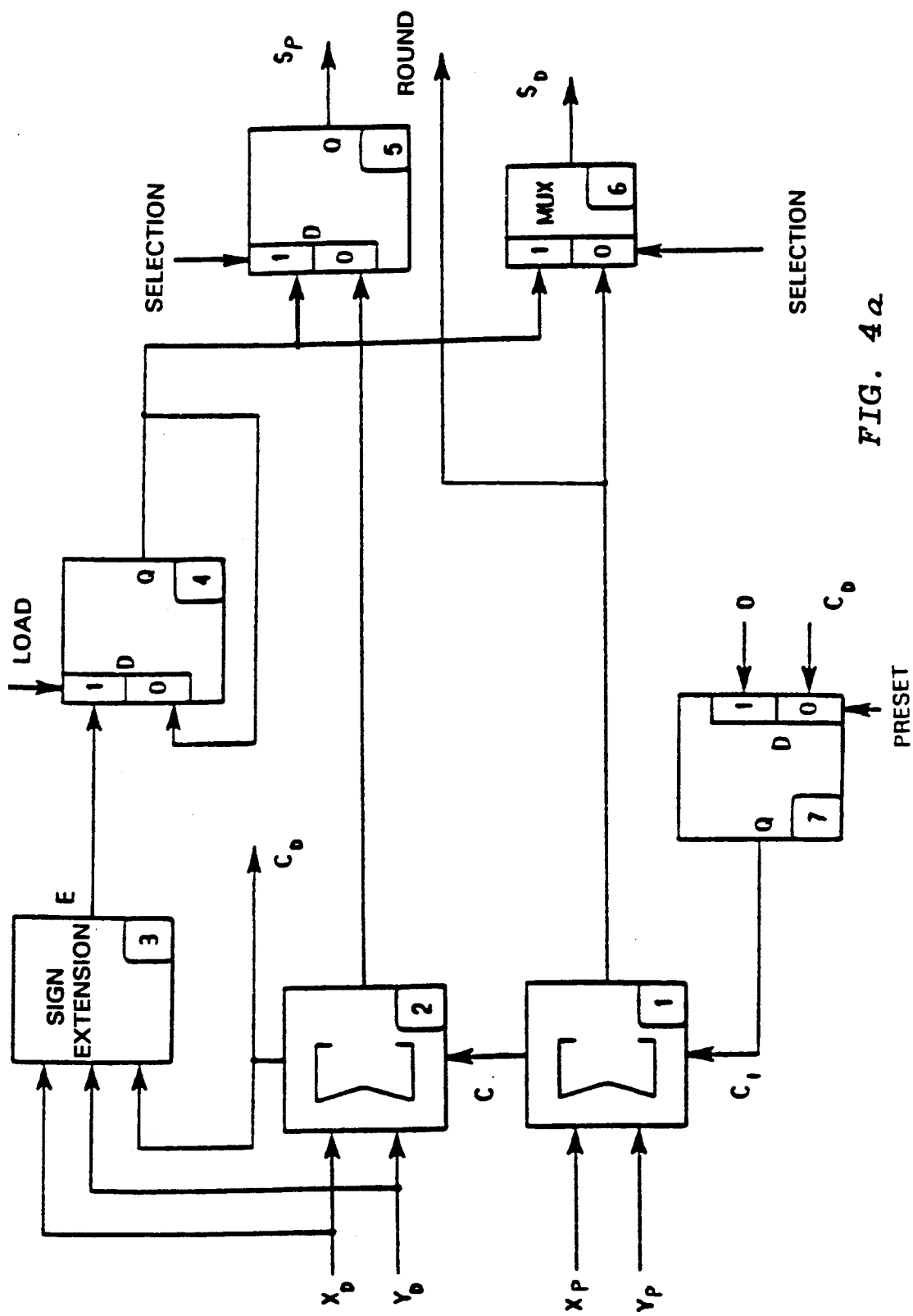
FIG. 4a illustrates the internal configuration of the circuit of FIG. 2.

Referring to a variable of weight $2^0$, it can be seen that to make the correct weighting according to $2^{-3}$, it is necessary to compute the sign extension on three bits. In this case, the internal configuration of the circuit of FIG. 2 is illustrated in FIG. 4a ("ODD" adder), that is different from the FIG. 3a in the block "5" (Flip-Flop with selection instead of a simple multiplexer). The operation is similar to that shown for the EVEN adder. FIG. 4b shows a diagram of the summation $(X+Y)2^{-3}$ versus time.

Again, the 2i-th bits and the (2i+1)th are processed contemporaneously and "E" is the sign extension of the summation $(X+Y)2^{-3}$. It should be noted that to make the correct sign extension on 3 bits and synchronization, it is necessary to delay one of the two outputs and also invert these outputs. In this case, it is possible to directly make the following summation to the variable X $2^0$. If, instead of carrying out summation, a subtraction (e.g. $-X+Y$) is necessary, X is negated and 1 is put as the initial carry.

A CALCULATION THROTTLE

Figures 5A, 5B, 5C, 5D:
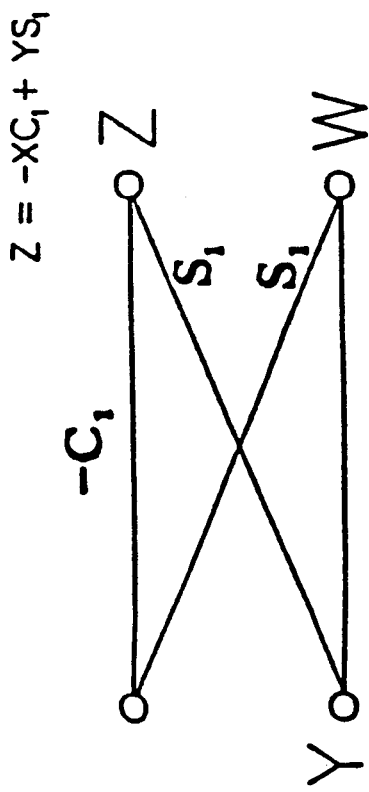
FIG. 5a shows the calculation throttle $\{C_1, S_1\}$.
FIG. 5b shows the coefficients $\{C_1 = \cos \pi/8\}$ represented with 14 fractionary bits.
FIG. 5c shows the corresponding $\{S'_{li}, C'_{li}\}$ in ternary representation.
FIG. 5d shows the outputs Z and W as successions of summations.

When the "Fast" methods for carrying out the transform calculations are used, the forming blocks are multiplication throttles. They are made up of multiplicands (variable quantities) and multipliers (fixed quantities). FIG. 5a shows the calculation throttle {C1,S1} as an example of the use of elementary adder/subtractor blocks to achieve the multiplication inside the throttle. The multiplicands (variable data) are in the form of bit couples entering and outgoing in a serial manner; the multiplicands {C1,S1} are fixed numbers and, during the calculation of the DCT transform correspond to the binary representation on m functionary bits (as many as necessary) of the sine and cosine values used. The multiplicands are performed by a succession of partial summations.

The following shows how it is possible to reduce the number of partial summations required. The output W can be expressed as follows:

$$W = X \sum_{i=0}^{14} S'_{1i} 2^{-i} + Y \sum_{i=0}^{14} C'_{1i} 2^{-i}$$

where:

$$S'_{1i}, C'_{1i} = \{-1, 0, 1\}$$

using a ternary representation for the general coefficient of the throttle. This reduces the number of summations to be made, as the representation of multiplying coefficients having the maximum number of zeroes are attempted. FIG. 5b shows the coefficients $\{C_1 = \cos \pi/8, S_1 = \sin \pi/8\}$ represented with 14 fractionary bits. FIG. 5c shows the corresponding $\{S'_{1i}, C'_{1i}\}$ in ternary representation, where the value $-1$ is indicated by 1.

Figure 5E:
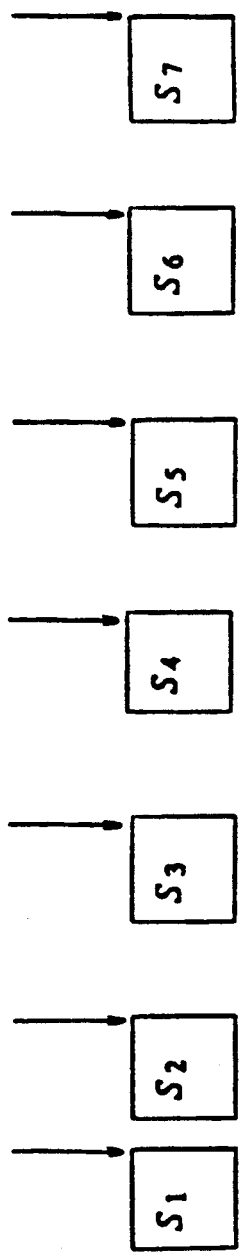
FIG. 5e shows the output W as successions of partial summations.
Figure 5F:
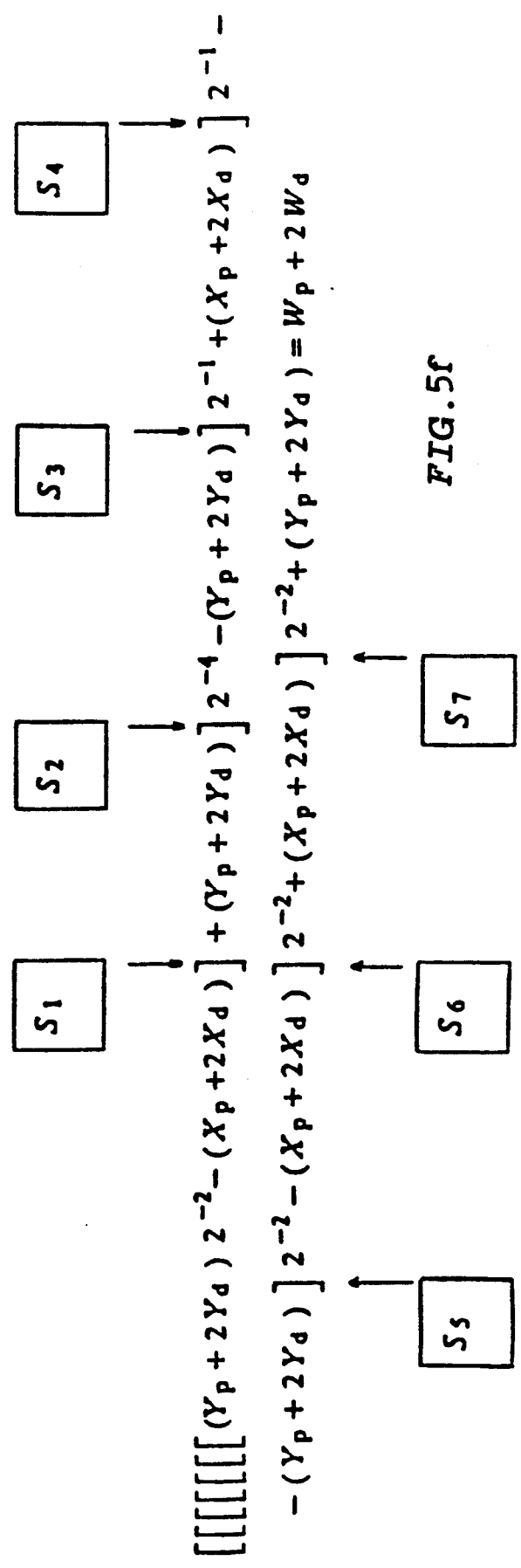
FIG. 5f shows that the succession of partial summations is evidenced by the representation of even and odd bits.
Figure 5G:
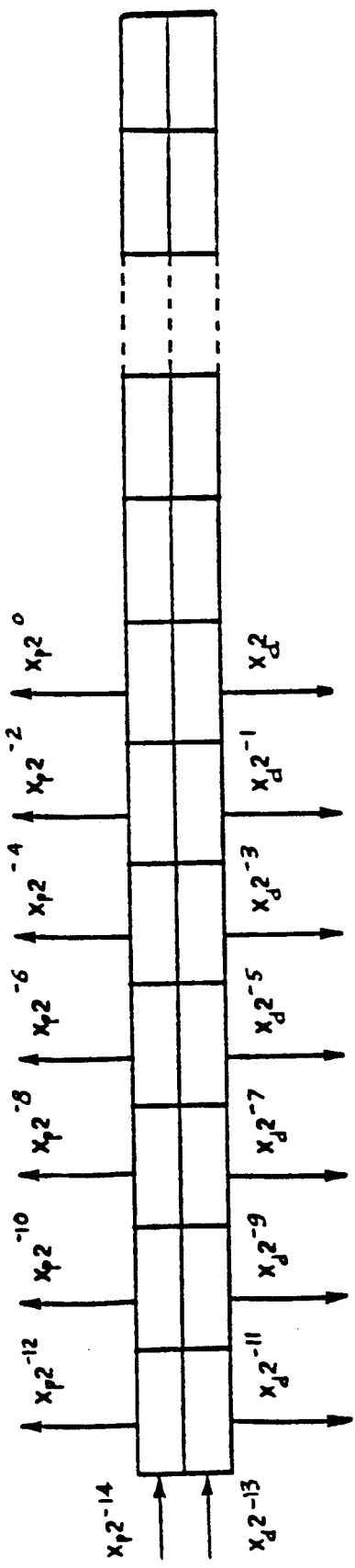
FIG. 5g represents the corresponding implementing for calculating W.
Figure 5G:
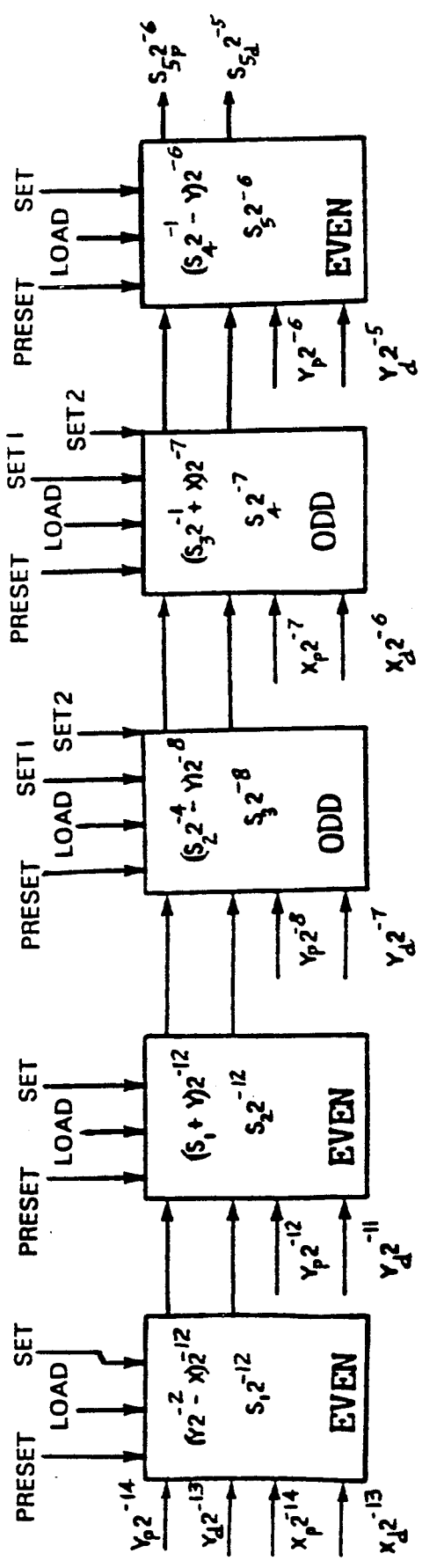
Figure 5G:
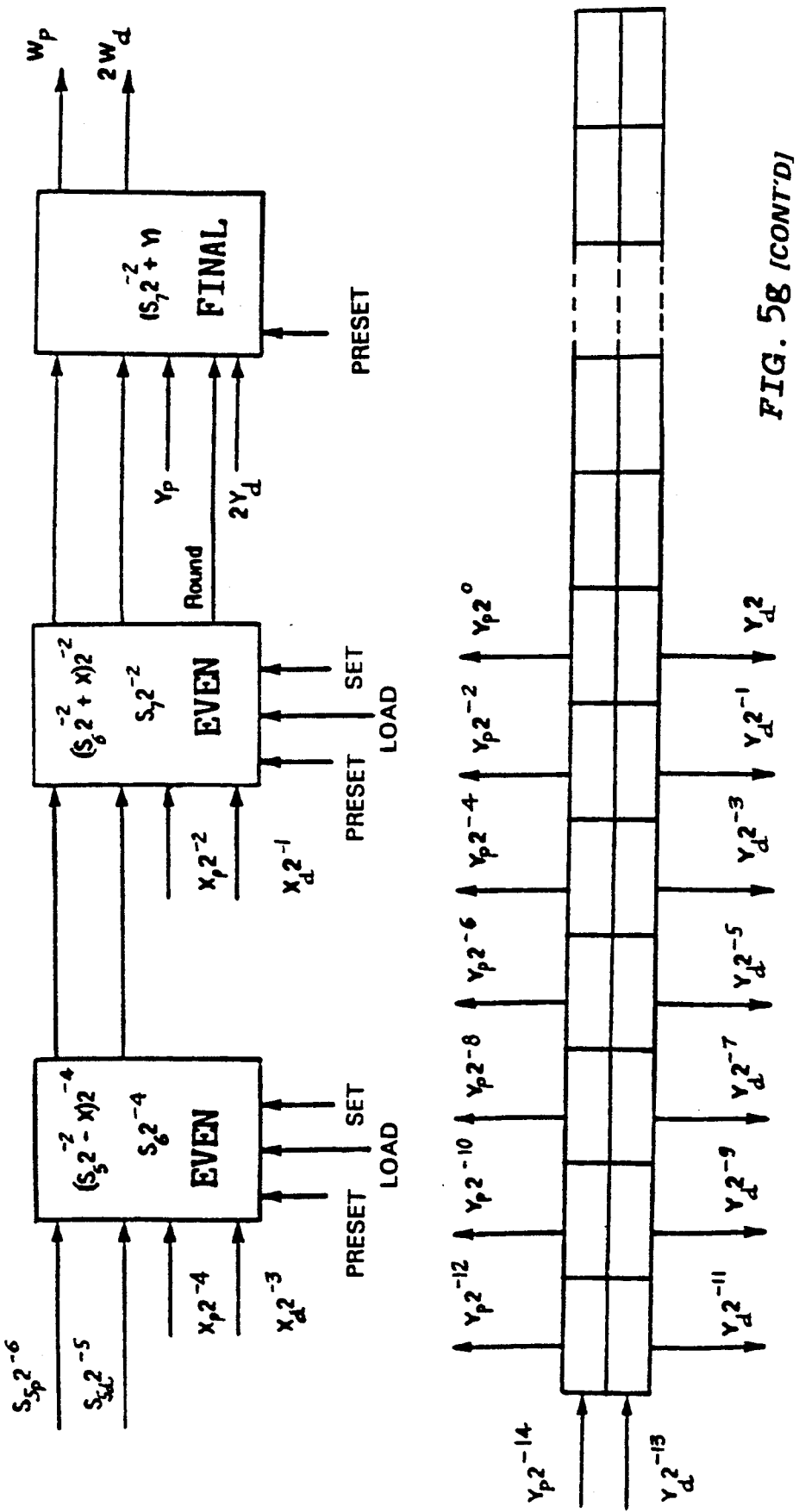

FIG. 5d shows the outputs Z and W as successions of summations and FIG. 5e shows the output W as a succession of partial summations. FIG. 5f shows that the successions of partial summations is evidenced by the representation with even bits and odd bits. FIG. 5g represents the corresponding implementation for calculating W (for getting the output Z of the throttle, a similar scheme is implemented).

As already shown, the even bits and the odd bits of each bit couple in the input of the generic adder/subtractor (both of EVEN or ODD type), although they have different binary weights, are processed simultaneously. Using a cascade of EVEN and ODD adders/subtractors, as illustrated before and suitably synchronizing the inputs and control signals, it is then possible to fulfill any calculation throttle. The "FINAL" adder is similar to the EVEN adder, but it does not carry out any sign extension.

It should be the "Round" input of the FINAL adder forms the initial carry of the final summation. To round off the summation, the initial carry should be equal to 1 in all cases at the suitable time instant. It is easy to verify that:

$$\text{Round} = \text{bit } \#1 \text{ di } S_7 2^{-2} = (S_7 2^{-2})_1$$

Thus, to round off, it is sufficient that the initial carry of the final summation is taken from a suitable bit of the odd output flow of the last EVEN adder (if the last adder preceding the FINAL block is an ODD adder, the reasoning is similar).

THE SERIAL-PARALLEL-SERIAL CONVERTER

Figure 6A:
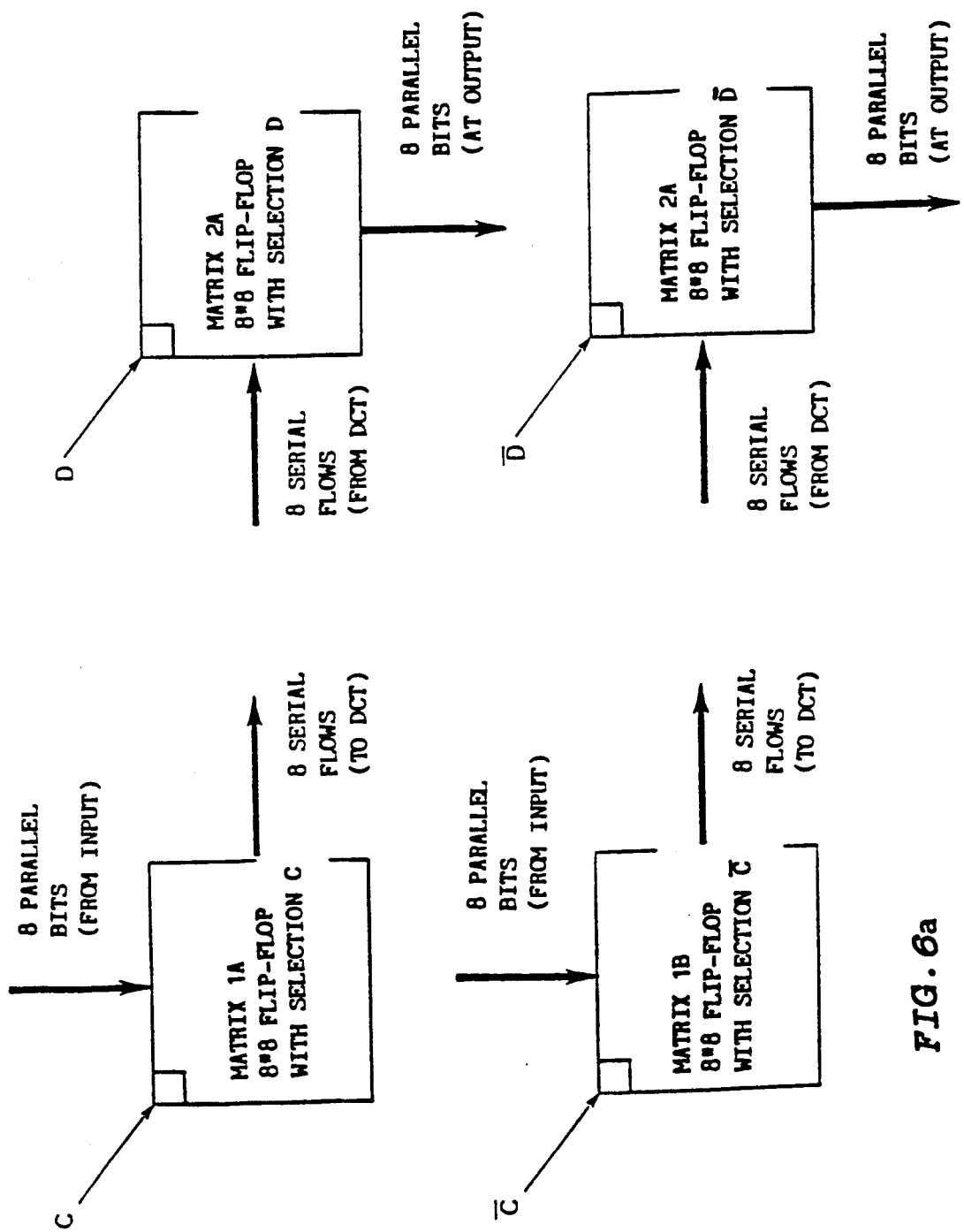
FIG. 6a shows the principle scheme of the basic element forming the serial-parallel-serial converter.

The following is a description of the circuit that operates on the even bits; the implementation for the odd bits is similar. Assume that the words entering into and outgoing from the processor DCT are represented by 16 bits. FIG. 6a shows the principle scheme of the basic element forming the serial-parallel-serial converter; two matrix couples (MATRIX 1a, MATRIX 1b) and (MATRIX 2a, MATRIX 2b); while MATRIX 1a loads the data in parallel, MATRIX 1b loads the data in series (MATRIX 2a, MATRIX 2b work in similar manner in the serial-parallel conversion). The two matrix couples work, respectively:

(a) on the 8 even bits of the words, with parallel bits, converting them into a serial flow of even bits (MATRIX 1a, MATRIX 1b); in fact, the variable input quantities are written in parallel format and then must be converted into serial format before making the DCT calculation. More precisely, 8 parallel bits enter MATRIX 1a for each of 8 consecutive input words, at the end of this operation, the 8 words are sent to the output simultaneously in the form of serial bits. MATRIX 1b works in a similar manner, and its operation alternating in time with MATRIX 1a.

(b) on a flow of even bits, with serial bits, converting it into a flow of even bits (MATRIX 2a, MATRIX 2b); in fact the variable output quantities of the block DCTC (FIG. 1) are written in serial format and then must be converted into parallel format before being sent to the output. More precisely, 8 words in the form of serial bits enter MATRIX 2a simultaneously at the end of this operation, the 8 words are sent to the output in succession and in the form of serial bits MATRIX 2b works in a similar manner, alternating in time with MATRIX 2a.

Each element of the four matrixes is a Flip-Flop with selection; the selection is controlled by a suitable control signal, having a period equal to 16 clock strokes; in particular:

Control "C" for (MATRIX 1a, MATRIX 1b);
Control "D" for (MATRIX 2a, MATRIX 2b);

For example, for the couple (MATRIX 1a, MATRIX 1b):

For C=0
MATRIX 1a loads at input 8 parallel data bits for each of 8 input words.
MATRIX 1b unloads at input 8 serial data bits for each of 8 input words. (loaded in the former half period when C=1)

For C=1:
MATRIX 1a unloads at input 8 parallel data bits for each of 8 input words. (loaded in the former half period when C =0)
MATRIX 1b loads at input 8 parallel data bits for each of 8 input words.

The couple (MATRIX 2b, MATRIX 2b) performs the opposite operation as (MATRIX 1b, MATRIX 1b), being controlled by the signal D.

It must be noted that the delay introduced into the DCT calculation is generally equal to: N*8+K, then D is delayed (and negated) with respect to C of K clock cycles.

Figure 6B:
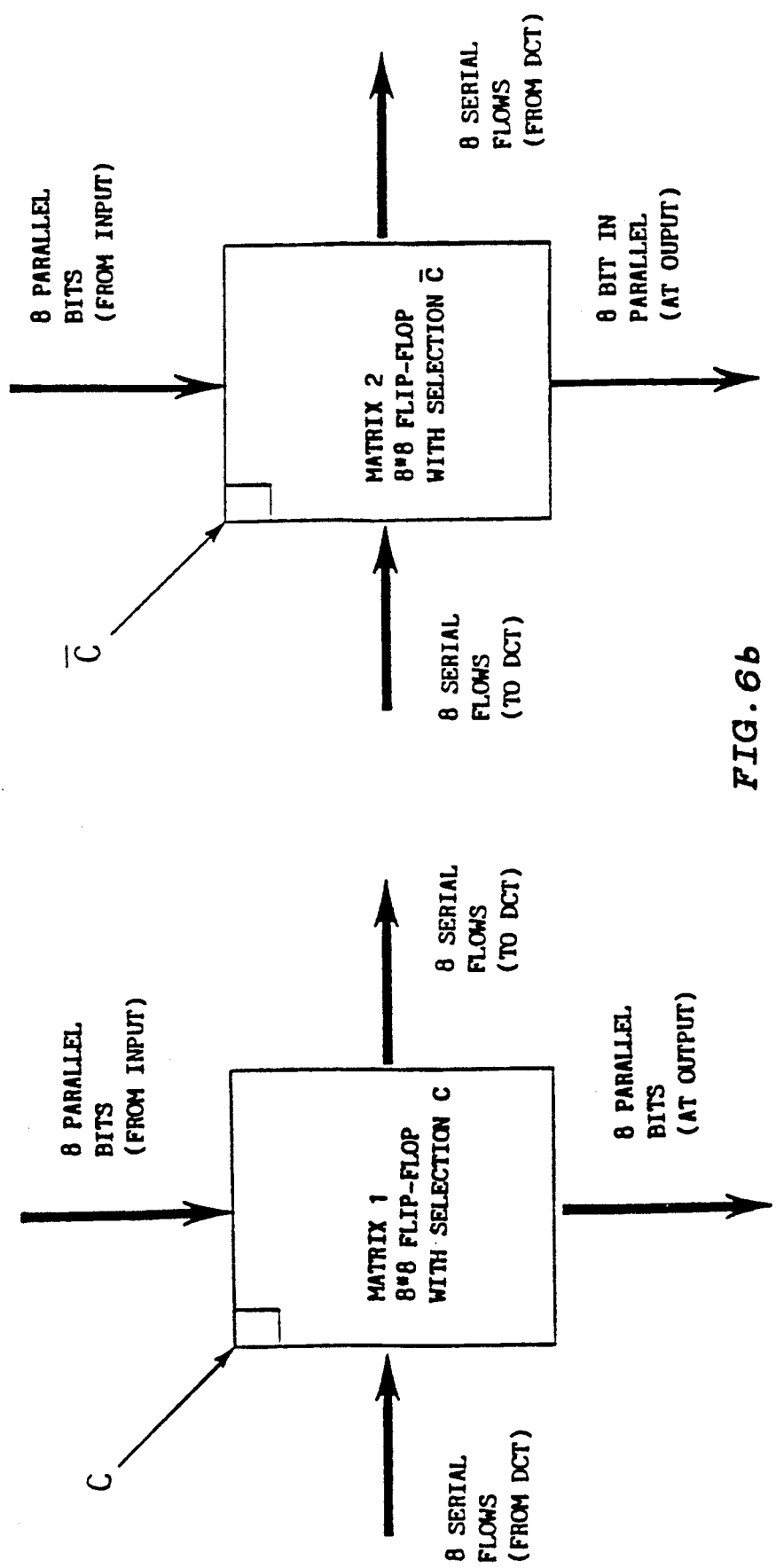
FIGS. 6b and 7a show matrix couples.

In the case when the delay introduced into the DCT calculation is equal to N*8 (K=0), it is possible to use a sole matrix couple (MATRIX 1, MATRIX to carry out the above mentioned operations. In particular, the operations performed by MATRIX 1a and MATRIX 1b can be combined into a sole MATRIX 1; similarly the operation performed by MATRIX 1b and MATRIX 2a can be combined into a sole MATRIX 2. The resulting scheme is shown in FIG. 6b and the running principle is the following one:

For C=0:
MATRIX 1a loads at input 8 parallel data; simultaneously, the parallel output of data is loaded serially in the preceding half period of C (C=1).
MATRIX 2 loads in input the serial data; simultaneously, the serial output of data is loaded parallel in the preceding half period of C (C=0).

For C=1:
MATRIX 2 loads at input 8 parallel data; simultaneously, the parallel output of data is loaded serially in the preceding half period of C (C=1).

MATRIX 1 loads in input the serial data simultaneously, the serial output of data is loaded in parallel in the preceding half period of C (C=0).

It is important that in this manner all elements of the structure are always working; this is possible because the calculation time of the bidimensional DCT (cascade of DCTR, MEMCG, DCTC) has been made a multiple of 8 clock strokes. The matrices MATRIX 1, MATRIX 2) work in an alternating manner, or when 8 words with parallel bits come into and out of one of them, the other matrix inputs and outputs 8 words of serial bits at the same time. Each of these two matrices work in one of the two manners on the 7 words that come in and go out sequentially over the time (if they are made-up of parallel bits and, vice versa, come in and go out simultaneously if they are made-up of serial bits.

THE EXCHANGE MEMORY (MEMCG)

Figure 7A:
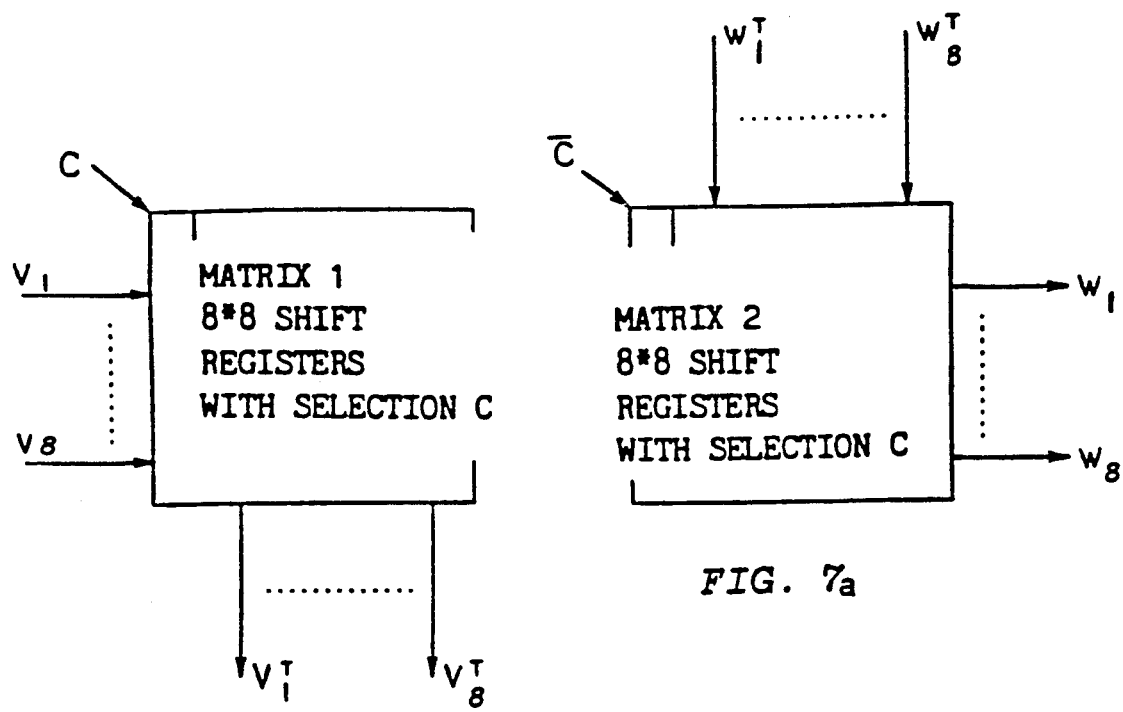

The block MEMCG exchanges the rows and columns of a matrix of 8*8 samples, downstream a monodimensional transform; then it carries out the transposition of a matrix. As before, the following is only a description of the circuit which operates on the even bits; the implementation is similar for the odd bits. Basically, the principle of operation is similar to the principle of PARSERG; the main element is a matrix couple (FIG. 7a). Each element of a matrix is a generic memory element with selection; the selection is controlled by a suitable control signal having a period equal to 128 clock cycles. The inputs are serial and form the 8 vectors of the matrix (each vector is formed by 7 elements; each element of a generic ventor is formed by 8 variable even bits).

With reference to the FIG. 7a:

For C=0:

MATRIX 1 loads 8 vectors V1 ... V8, while MATRIX 2 loads 8 vectors W1 ... W8, loaded in the preceding half period of C (C=1).

For C =1:

MATRIX 2 loads 8 vectors $W1^T$ ... $W8^T$, while MATRIX 1 unloads 8 vectors $V1^T$ ... $V8^T$, loaded in the preceding half period of C(C=0).

Figure 7B:
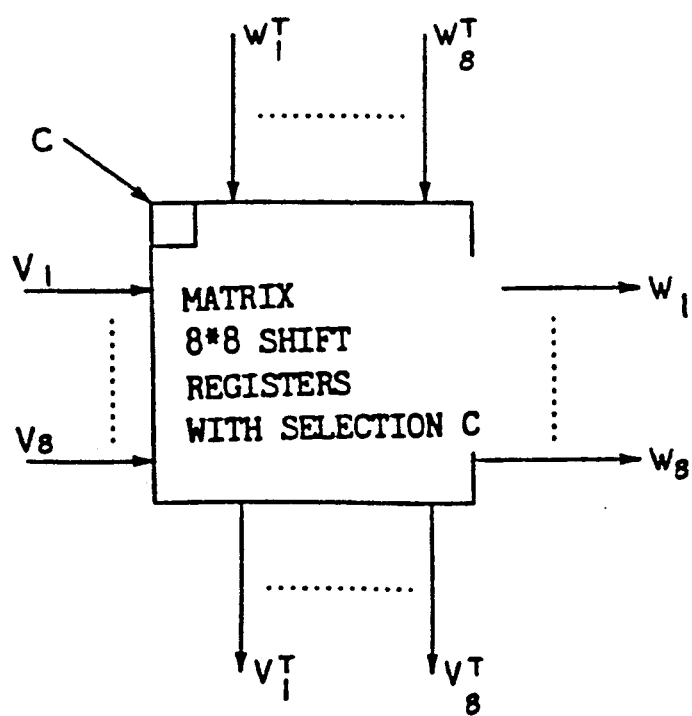
FIG. 7b shows the implementation of a single matrix.

Similarly to the description with respect to the PARSERG, it is possible to fulfill single matrix (FIG. 7b) with all elements always in working phase.

When C=0, the vectors V1 ... V8, are loaded and simultaneously the vectors W1 ... W8 loaded in the preceding half period of C (C=1) are unloaded.

When C=1, the vectors $W1^T$ ... W8 loaded and simultaneously the vectors $V1^T$ ... $V8^T$ loaded in the former half period of C (C=0) are unloaded.

THE SHIFT ON SAMPLES OF TRANSFORMED SIGNAL (INTIG-INTOG)

The DCT calculation is made without any scaling; however, usually the DCT data are reduced in precision to permit transmission. Therefore, it is advantageous to insert an element that makes a shift onto the transform coefficients; in particular, it is advantageous to use a scaler that multiplies by $2^{31\ n/8}$, where n is an integral number.

The reasons of this selection are as follows;

A simplification in hardware implementation;

Using the factor $2^{-n/8}$, the shift is constant in percentage.

In reception, an inverse scaler must be used that multiplies by the DCT coefficients by $2^{-n/8}$ before making the inverse-transform. The transmission scaler can be written as $$2^{-n/8}, = 2^{31\ n\ 1/8} * 2^{-n_2}, n=0 \ldots 127$$

with:

$$n_1 = 0 \ldots 7$$

$$n_2 = 0 \ldots 15$$

Figure 8A:
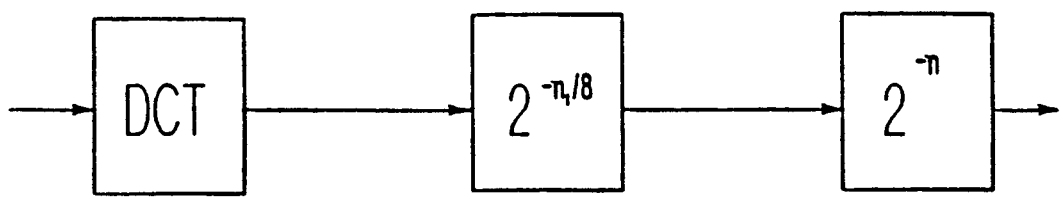
FIG. 8a shows the chain of two shifts in transmission.
Figure 8B:
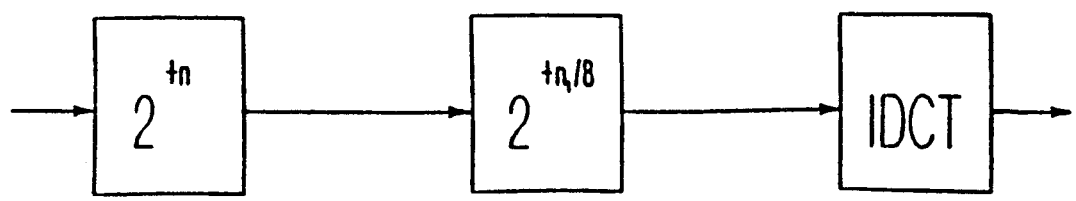
FIG. 8b, shows the ideal inverse operation in reception.

Then, the shift is made, in transmission, by a multiplication by a fixed coefficient ($2^{-n_1/8}, n_1 = 0 \ldots 7$) and a simple shift. FIG. 8a shows the chain of two shifts in transmission. The ideal inverse operation in reception is represented in FIG. 8b. To eliminate the drawback of having 14 fixed multiplicand factors ($2^{-n_1/8}$ in reception $2^{-n_1/8}$ in reception, $n_1 = 0 \ldots 7$) the shift in reception is made in the following manner $$2^{-n/8} = 2^{-n_2} + 1 * 2^{-(8-n_2)8} n_1 \neq 0$$

$$2^{-n/8} = 2^{-n_2} n_1 = 0$$

It should be in FIGS. 8a and 8b, the different order in which the multiplier and the shifter are placed transmission and in reception. In transmission, the coefficients of the transformed signal are shifted "downwards" (multiplied by $2^{-n/8}$); therefore, in order to avoid losing the precision, it is necessary to first make the multiplication by $2^{-n_1/8}$ and then the shift of $2^{-n_2}$. In reception, the coefficients of the transformed signal must be shifted "upwards" (multiplication by $2^{n/8}$); then, it is n :cessary to first make the shift $2^{n_2+1}$ and then the multipliation by $2^{-(8-n_l)/8}$.

What is claimed is:

1. A circuit for performing a bidimensional transform of dimension M*M, comprising:

means for converting incoming words in the form of parallel bits into words represented by coupled bits serially distributed over the time;

means for applying a monodimensional transform onto the lines of a block of M*M data, treating the data in the form of serially distributed bits;

means for transposing from lines to columns the elements of said block of M&M data;

means for carrying out a monodimensional transform onto the columns of said block of M*M data; and means for carrying out a conversion from serial bit couples to words in the form of parallel bits.

2. A circuit in accordance with claim 1, implemented on a silicon base, including: an input interface; a converter of incoming words from the form of parallel bits to the form of words represented by serial bit couples for incoming words and vice versa for the outgoing words; a first operator for performing the monodimensional DCT transform; a transpositor from transposing rows to columns; a second operator for performing the monodimensional transform; and a scaling device for scaling outgoing words.

* * * * *